(12) United States Patent
Carey et al.

(10) Patent No.: US 6,548,186 B1
(45) Date of Patent: Apr. 15, 2003

(54) HIGH RESISTIVITY FILMS FOR AP LAYERS IN SPIN VALVES

(75) Inventors: Matthew Joseph Carey, San Jose, CA (US); Bruce Alvin Gurney, San Rafael, CA (US); Robert John Wilson, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/574,301

(22) Filed: May 19, 2000

(51) Int. Cl.$^7$ .................... G11B 5/39; B32B 15/04; B32B 15/18; B32B 15/01
(52) U.S. Cl. ................ 428/611; 428/668; 428/679; 428/704; 428/693; 428/686; 360/324.12; 338/32 R
(58) Field of Search ................ 428/611, 615, 428/668, 678, 679, 680, 686, 692, 693, 704, 660, 212, 900, 928; 360/313, 314, 324, 324.1, 324.11, 324.12, 325, 326, 126; 338/32 R; 324/252

(56) References Cited

U.S. PATENT DOCUMENTS

| | | | |
|---|---|---|---|
| 5,591,533 A | | 1/1997 | Pinarbasi .................... 428/611 |
| 5,811,155 A | | 9/1998 | Pinarbasi .................... 427/131 |
| 5,856,897 A | * | 1/1999 | Mauri ........................ 360/110 |
| 5,898,549 A | * | 4/1999 | Gill ............................ 360/113 |
| 6,034,847 A | | 3/2000 | Komuro et al. ............. 360/126 |
| 6,127,053 A | * | 10/2000 | Lin et al. .................... 428/692 |
| 6,201,673 B1 | * | 3/2001 | Rottmayer et al. .... 360/324.12 |
| 6,271,997 B1 | * | 8/2001 | Gill ............................ 360/314 |
| 6,340,533 B1 | * | 1/2002 | Ueno et al. ................. 428/611 |
| 6,353,519 B2 | * | 3/2002 | Pinarbasi ............... 360/324.11 |
| 6,387,548 B1 | * | 5/2002 | Hasegawa et al. .......... 428/692 |
| 6,392,853 B1 | * | 5/2002 | Li et al. ................ 360/324.12 |

* cited by examiner

*Primary Examiner*—Deborah Jones
*Assistant Examiner*—Michael La Villa
(74) *Attorney, Agent, or Firm*—Lumen Intellectual Property Services, Inc.

(57) ABSTRACT

In a spin valve, at least one AP pinned sublayer and/or one AP free sublayer comprise high resistivity alloys of the type AB, wherein A is selected from the group consisting of CoFe, NiFe, and CoFeNi, and B is selected from the group consisting of B, Ta, Nb, Zr, and/or Hf. The resistivity value of the highly resistive layer is typically between about 30 $\mu\Omega$-cm and 100 $\mu\Omega$-cm. The highly resistive layers reduce the shunting of the sense current away from the rest of the structure, and prevent electrons from being shunted away from the active region of the spin valve and, thus, reducing $\Delta R/R$. The spin valve of this layered structure can increase the overall sheet resistance and optimize the $\Delta R/R$ value of the spin valve.

4 Claims, 3 Drawing Sheets

HIGH RESISTIVITY FILMS FOR AP LAYERS IN SPIN VALVES

FIELD OF THE INVENTION

This invention relates generally to spin valves. More particularly, it relates to a structure of high resistivity ferromagnetic films for AP layers in spin valves.

BACKGROUND ART

A spin valve or a magnetoresistive (MR) sensor detects magnetic field signals through the resistance changes of a read element, fabricated of a magnetic material, as a function of the strength and direction of magnetic flux being sensed by the read element. The conventional MR sensor operates on the basis of the anisotropic magnetoresistive (AMR) effect in which a component of the read element resistance varies as the square of the cosine of the angle between the magnetization in the read element and the direction of sense current flow through the read element. Recorded data can be read from a magnetic medium because the external magnetic field from the recorded magnetic medium (the signal field) causes a change in the direction of magnetization in the read element, which in turn causes a change in resistance ($\Delta R/R$) in the read element and a corresponding change in the sensed current or voltage.

A spin valve has been identified in which the resistance between two uncoupled ferromagnetic layers is observed to vary as the cosine of the angle between the magnetizations of the two layers and is independent of the direction of current flow. The spin valve produces a magnetoresistance that, for selected combinations of materials, is greater in magnitude than the AMR. In general, the larger $\Delta R/R$ is the better the spin valve's performance.

An external magnetic field causes a variation in the relative orientation of the magnetization of a neighboring ferromagnetic layer. This in turn causes a change in the spin-dependent scattering of conduction electrons and thus the electrical resistance of the spin valve. The resistance of the spin valve thus changes as the relative alignment of the magnetizations of the ferromagnetic layers changes.

Typically, a conventional spin valve comprises a ferromagnetic free layer, a spacer layer, and a single-layer pinned ferromagnetic layer, which is exchange-coupled with an antiferromagnetic (AF) layer. In an anti-parallel (AP) pinned spin valve, the single-layer pinned ferromagnetic layer is replaced by a laminated structure comprising at least two ferromagnetic pinned sublayers separated by one or more thin anti-ferromagnetic (AF) coupling or AP spacer sublayers. The two ferromagnetic pinned sublayers are antiferromagnetically coupled to one another, by means of the appropriate type and thickness of AF coupling sublayer, so that their magnetizations are oriented anti-parallel to one another. Since the moments are anti-parallel, the net moment of the AP structure is the difference of the net moments of the magnetic sublayers. Thus, the net moment can then be made arbitrarily small. This greatly enhances the pinning of the AP layer, since the pinning between the AP layer and the antiferromagnetic layer is inversely proportional to the net moment.

A usual spin valve usually has a single or double layered ferromagnetic free layer. The single layer version is typically permalloy. Often a thin layer of cobalt or cobalt alloy is applied to enhance the $\Delta R/R$ of the spin valve. This double layered structure is referred to as a nanolayered structure.

Future high density recording applications require very small net magnetic moments for the free layer. This can be obtained by reducing the physical thickness of the free layer, but $\Delta R/R$ drops. The AP free layer design can be used to offset this loss in $\Delta R/R$. Just as in the AP pinned layer, the net magnetic moment is reduced without reducing the physical thickness. However, the additional ferromagnetic pinned sublayer and the AP spacer sublayer are conductive, so they tend to shunt the sense current away from the "active" region of the spin valve. This reduces the resistance of the sensor, reducing the voltage obtained for a given current. Further, the shunting effect of the extra layers in an AP structure reduces the number of electrons that undergo spin-dependent scattering by removing them from the active region around the free layer and the first pinned sublayer. Since the signal ($\Delta R/R$) in a spin valve results from the spin-dependent scattering of electrons, the shunting effect reduces the $\Delta R/R$ value.

U.S. Pat. No. 5,591,533, filed Jun. 1, 1995 discloses a simple spin valve in which a substrate surface layer comprises a metal such as Cr or Ta. The substrate layer has a surface typically comprising $Al_2O_3$ or $SiO_2$. Chromium and tantalum are deposited over and contiguous with a top layer of $Al_2O_3$ or $SiO_2$. These metals after deposition have high resistivity due to partial oxidation when formed on the substrate. This highly resistive surface layer prevents the electrons from scattering into the substrate layer, which reduces shunting of the sense current in the magnetoresistive element and further acts as a barrier to protect the alloy from interface contamination. Thus, this is a method to increase signal by reducing shunting. However, this technique cannot be used in AP layers, since the oxide layers noted are non-magnetic.

U.S. Pat. No. 5,898,549 filed Oct. 27, 1997 disclosed an anti-parallel (AP) pinned spin valve in which the AP pinned layer includes first, second, and third pinned layers, where the first pinned layer is separated from the second and third pinned layers by an anti-parallel coupling layer. The first and second pinned layers are made of highly resistive material such as NiFeCr, NiFeRh, or NiFeMo, and the third pinned layer is made of low resistive material such as Cobalt. The use of highly resistive first and second pinned layers reduces the amount of sense current flowing in the AP-pinned layer. However, this technique teaches the use of only NiFeCr, NiFeRh, and NiFeMo to make the highly resistive pinned layer, and does not teach a highly resistive AP ferromagnetic free layer. In addition, the NiFe-based alloys have lower magnetizations than the Cobalt alloys. In order to obtain a target value for the moment of a sublayer, the NiFe-based alloys need to be thicker, negating some of the advantages of the high resistivity of the layers. Cobalt has a moment 1.7 times the value of NiFe. Thus, a Co-based alloy can be 1.7 times thinner than its NiFe-based counterpart. Given similar resistivities, the cobalt alloys will shunt 1.7 times less current, a marked improvement over the NiFe alloys. Furthermore, U.S. Pat. No. 5,898,549 does not discuss the effect of the highly resistive layer on $\Delta R/R$ value.

There is a need, therefore, for high resistivity ferromagnetic films for use in the AP pinned and/or AP free layers of spin valves. These will reduce the net magnetic moment of the free and/or pinned layers with less reduction in $\Delta R/R$ that would occur if the physical thickness of the layers were simply reduced.

OBJECTS AND ADVANTAGES

Accordingly, it is a primary object of the present invention to provide a structure for spin valves with highly resistive films for AP pinned layer and AP free layer that:

1) can increase the overall sheet resistance of the spin valve
2) can reduce the shunting of the sense current
3) can optimize the ΔR/R value of the spin valve These and other objects and advantages will be apparent upon reading the following description and accompanying drawings.

SUMMARY

These objects and advantages are attained by a spin valve that detects an external magnetic field with the aid of high resistivity films for AP layers in the spin valve. The high resistive layer can be within an AP pinned layer and/or an AP free layer of the spin valve.

Typically, a simple spin valve comprises an antiferromagnetic (AF) layer, a pinned ferromagnetic layer, a ferromagnetic free layer, and a non-magnetic spacer layer. In an AP spin valve the pinned layer, the free layer or both are replaced by a trilayer, AP structure comprising a first ferromagnetic sublayer, a nonmagnetic AP spacer sublayer and a second ferromagnetic sublayer. An AP spin valve typically has lower ΔR/R value than a simple spin valve, because the extra ferromagnetic sublayer and AP spacer sublayer are conductive, and therefore they shunt the sense current away from the rest of the structure of spin valve. The shunting effect of the extra layers in an AP structure reduces the number of electrons that undergo spin-dependent scattering by removing them from the "active" region around the free layer and the first pinned sublayer. The signal (ΔR/R) in a spin valve, which results from spin dependent scattering of electrons, is reduced due to the shunting loss from the additional layers.

In accordance with a first embodiment of the present invention, the AP pinned ferromagnetic layer comprises a first ferromagnetic pinned sublayer, a second ferromagnetic pinned sublayer, and an AP spacer sublayer between the first and second ferromagnetic pinned sublayer. One of the two ferromagnetic pinned sublayers of the AP pinned layer is a highly resistive layer that may include a highly resistive alloy of the type AB, wherein A is selected from the group consisting of NiFe, CoFe, or CoFeNi, and B is selected from the group consisting of B, Ta, Nb, Zr, and/or Hf.

In accordance with a second embodiment of the present invention, the AP ferromagnetic free layer of a simple spin valve comprises a first ferromagnetic free sublayer, an AP coupling nonmagnetic sublayer, and a second ferromagnetic free sublayer. One of the two ferromagnetic free sublayers of the AP free layer is a highly resistive layer that includes similar high resistivity materials to the AP pinned sublayer in the first embodiment of the present invention.

In accordance with a third embodiment of the present invention, either or both of the AP ferromagnetic free layer and the AP pinned layer of a spin valve include a highly resistive sublayer that includes the similar high resistivity materials to the AP pinned sublayer in the first embodiment of the present invention.

In accordance with a fourth embodiment of the present invention, a dual spin valve comprises two AP ferromagnetic pinned layers located symmetrically about a ferromagnetic free layer. Either or both of the AP ferromagnetic pinned layers include a highly resistive sublayer that includes the similar high resistivity materials to the AP pinned sublayer in the first embodiment of the present invention.

The high resistivity materials of the AP pinned layer and/or AP free layer reduce the shunting effect, thereby optimizing the ΔR/R value.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiments of the invention is set forth without any loss of generality to, and without imposing limitations upon, the claimed invention.

Figure 1:
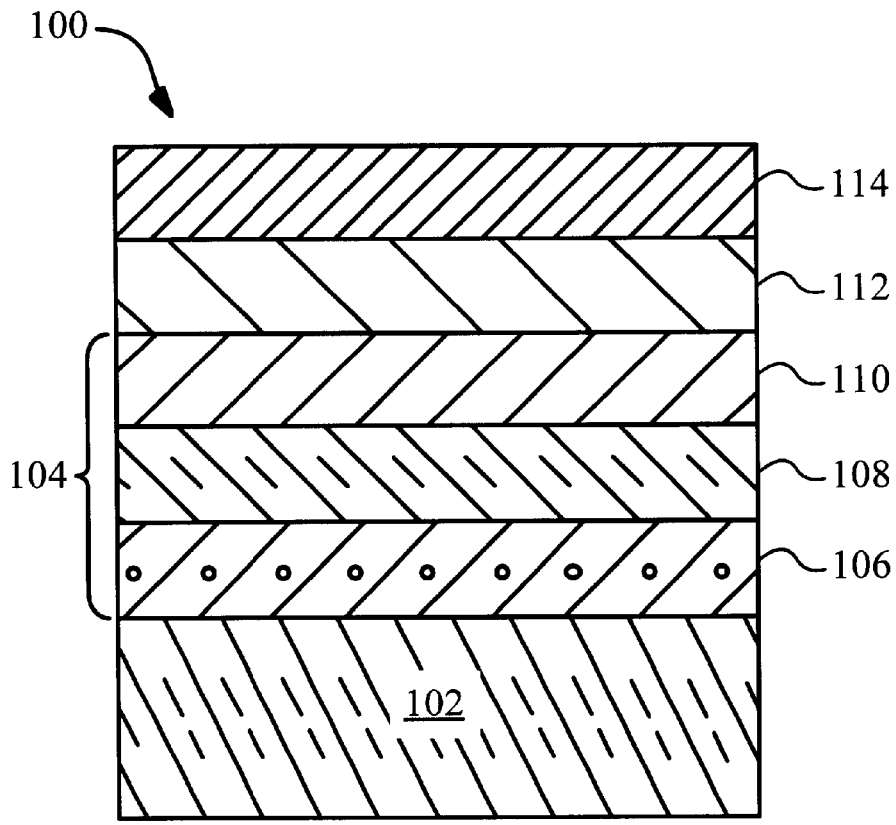
FIG. 1 shows a cross-sectional schematic diagram of a spin valve with a highly resistive AP pinned sublayer according to a first embodiment of the present invention.

The salient features of the high resistivity films for AP layers in spin valves according to the present invention will be best understood by reviewing the schematic diagrams. FIG. 1 shows a cross-sectional schematic diagram of a spin valve according to a first embodiment of the present invention. In this case spin valve 100 comprises an antiferromagnetic (AF) layer 102, an AP ferromagnetic pinned layer 104, and a ferromagnetic free layer 114. A spacer layer 112 is disposed between the AP pinned layer 104 and the free layer 114.

The AP ferromagnetic pinned layer 104 comprises a first ferromagnetic pinned sublayer 106, a second ferromagnetic pinned sublayer 110, and an anti-parallel (AP) spacer sublayer 108 between the first pinned sublayer 104 and the second pinned sublayer 110.

AF layer 102 typically comprises a material containing Mn. Suitable alloys containing Mn such as FeMn, PtMn, IrMn, PdPtMn and NiMn may be used. The thickness of AF layer 102 is typically between 60 Å and 500 Å. The pinned sublayers 106 and 110 typically comprise Co and have a thickness of between about 10 Å and 60 Å. The ferromagnetic free layer 114 typically comprises a material containing Ni, Fe, Co or alloys of Ni, Fe and Co such as NiFe, NiCo, and FeCo. This ferromagnetic free layer 114 has a thickness of between 15 Å and 100 Å. The spacer layer 112 is typically made of Cu, Ag, Au or their alloys. The AP spacer sublayer 108 typically can be made of Ru, Cr, Rh or Cu or their alloys. The thickness of the spacer layer typically is between about 4 Å and 20 Å.

The pinned sublayer 106 and the AP spacer sublayer 108 in the spin valve 100 tend to shunt the sense current away from the rest of the structure. The shunting effect reduces the number of electrons that undergo spin dependent scattering by removing them from the "active" region around the free layer 114 and pinned layer 110. The signal (ΔR/R) in a spin valve, which results from spin dependent scattering of electrons, is reduced by the shunting effect. By using a high resistivity material to make one of the pinned sublayers, much of the ΔR/R value is regained. The highly resistive ferromagnetic pinned sublayer is typically located farthest from the spacer layer 112, e.g., the highly resistive ferromagnetic pinned sublayer of the spin valve 100 is sublayer 106.

The resistivity value of the highly resistive pinned sublayer 106 is typically between about 30 $\mu\Omega$-cm and 100 $\mu\Omega$-cm. The value of ΔR/R is optimized by depositing a highly resistive pinned sublayer because this highly resistive sublayer prevents the electrons from flowing outside of the spin valve active region, and therefore the shunting of the sense current in the spin valve 100 is reduced. The highly resistive pinned sublayer 106 may include a highly resistive alloy of the type AB, wherein A is selected from the group consisting of NiFe, CoFe, or CoFeNi, and B is selected from the group consisting of B, Ta, Nb, Zr, and/or Hf.

Figure 2:
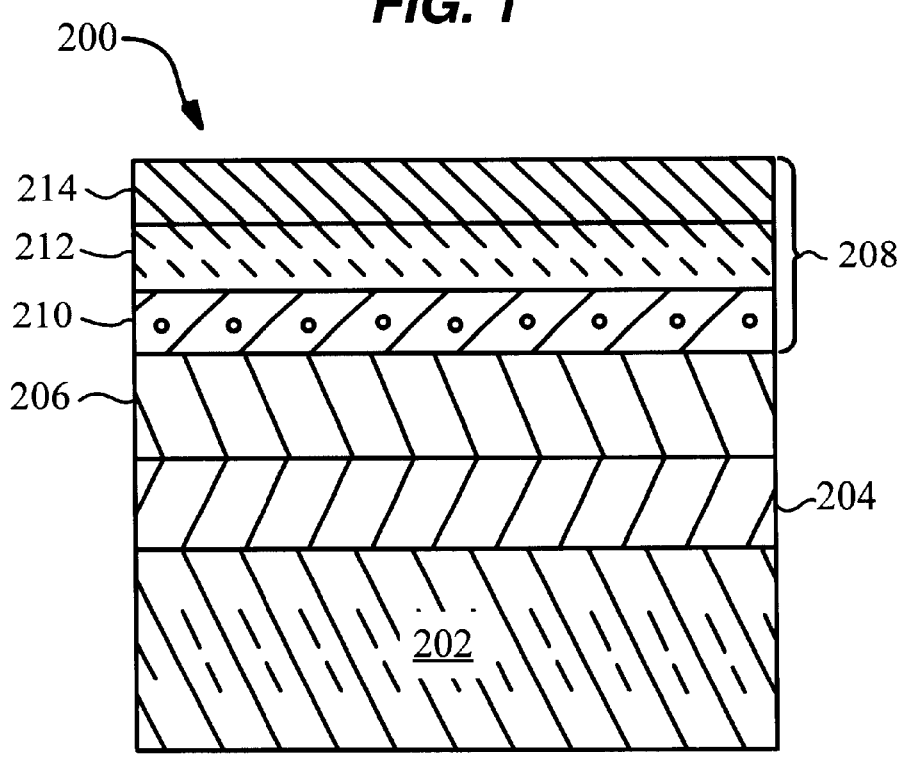
FIG. 2 shows a cross-sectional schematic diagram of a spin valve with a highly resistive AP free sublayer according to a second embodiment of the present invention.

The highly resistive layer may alternatively be included as a sublayer in an AP free layer. FIG. 2 shows a cross-sectional schematic diagram of a spin valve 200 in accordance with a second embodiment of the present invention. Specifically, FIG. 2 illustrates the layered structure of a spin valve 200. The spin valve 200 comprises an AF layer 202, a pinned layer 204, an AP ferromagnetic free layer 208, and a spacer layer 206 between the pinned layers 204 and the AP free layer 208. The materials and thickness of each layer in the spin valve 200 are similar to the layers in the spin valve 100 referring to FIG. 1.

AP ferromagnetic free layer 208 of spin valve 200 comprises a first ferromagnetic free sublayer 210, a second ferromagnetic free sublayer 214, and an AP spacer sublayer 212 between two free sublayers 210 and 214. The highly resistive layer in spin valve 200 is the sublayer 214, which is located farthest from the spacer layer 206. The sublayer 214 is made of a high resistivity alloy that is similar to the high resistivity materials of highly resistive pinned sublayer 106 referring to FIG. 1. The resistivity value of the sublayer 214 is typically between about 30 $\mu\Omega$-cm and 100 $\mu\Omega$-cm.

Figure 3:
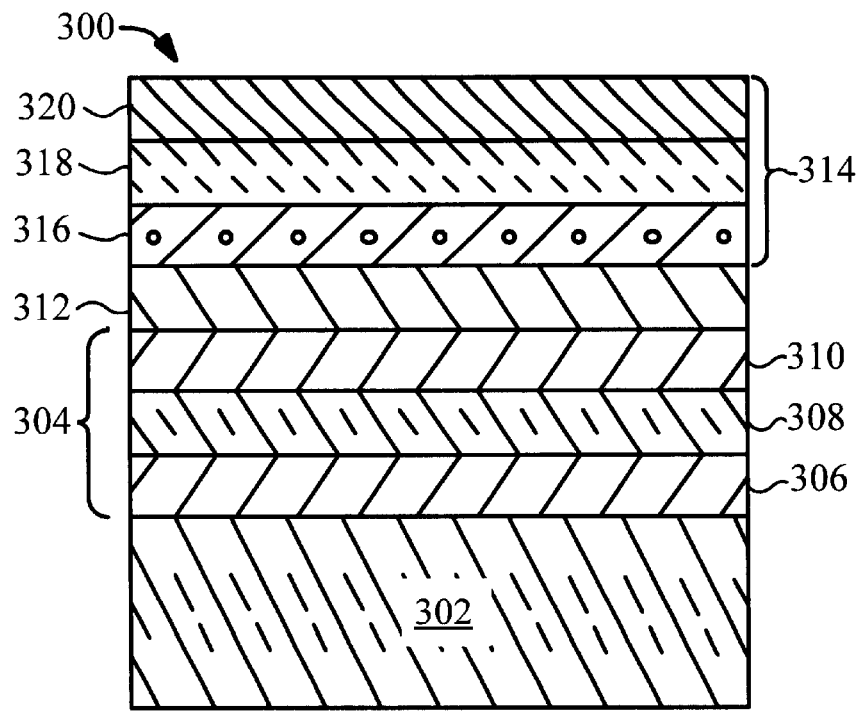
FIG. 3 shows a cross-sectional schematic diagram of a spin valve with a highly resistive AP free sublayer and/or a highly resistive AP pinned sublayer according to the third embodiment of the present invention.

Of course, either or both of the AP free layer and the AP pinned layer may include a highly resistive sublayer. FIG. 3 shows a cross-sectional schematic diagram of a spin valve 300 according to a third embodiment of the present invention. The basic layered structure of spin valve 300 is similar to the basic structure of spin valve 100 of FIG. 1. The spin valve 300 comprises an AF layer 302, an AP pinned ferromagnetic layer 304, and an AP ferromagnetic free layer 314, and a spacer layer 312 between the AP pinned layer 304 and the AP free layer 314. The AP ferromagnetic pinned layer 304 comprises a first ferromagnetic pinned sublayer 306, a second ferromagnetic pinned sublayer 310, and an AP spacer sublayer 308 between sublayer 306 and sublayer 310. The AP ferromagnetic free layer comprises a first ferromagnetic free sublayer 316, a second ferromagnetic free sublayer 320, and an AP spacer layer 318 between the free sublayer 316 and the free sublayer 320. The materials and thickness of each layer in the spin valve 300 are similar to the layers in the spin valve 100 referring to FIG. 1.

The highly resistive sublayer in spin valve 300 may be the free sublayer 320, which is located farthest from the spacer layer 312. The sublayer 320 is made of a high resistivity alloy that is similar to the high resistivity materials of highly resistive pinned sublayer 106 referring to FIG. 1. The resistivity value of the sublayer 320 is typically between about 30 $\mu\Omega$-cm and 100 $\mu\Omega$-cm. Alternately, AP pinned sublayer 306 could be the highly resistive layer or both AP free sublayer 320 and AP pinned sublayer 306.

Figure 4:
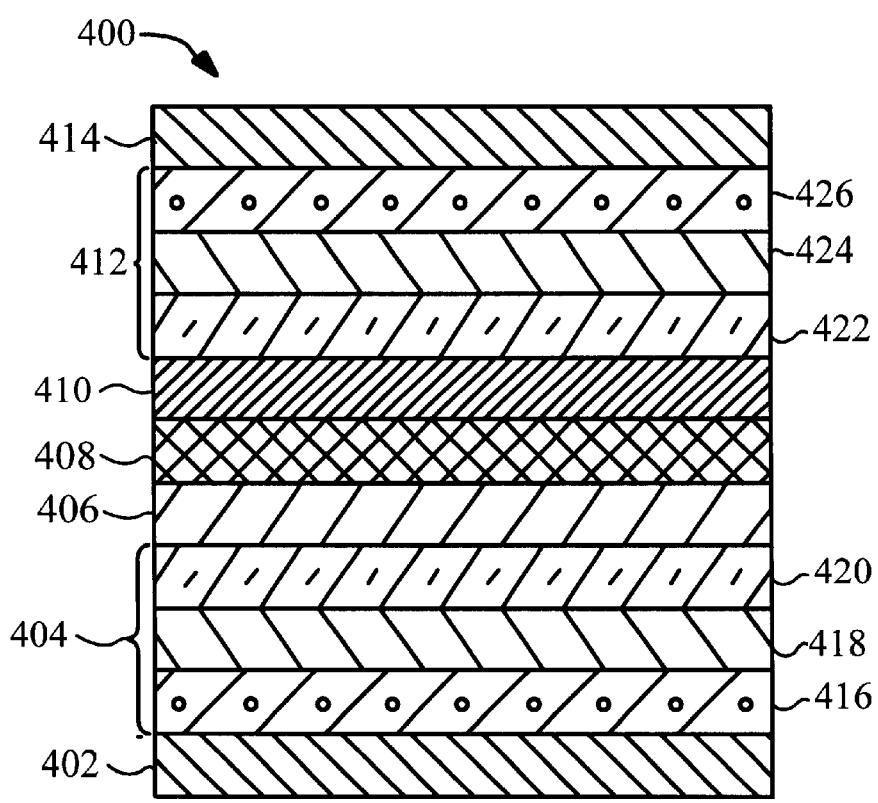
FIG. 4 shows a cross-sectional schematic diagram of a dual spin valve according to a fourth embodiment of the present invention.

FIG. 4 shows a cross-sectional schematic diagram of a dual spin valve 400 according to a fourth embodiment of the present invention. Dual spin valve 400 comprises a ferromagnetic free layer 408 and a first and second AP ferromagnetic pinned layers 404 and 412 located symmetrically about the free layer 408. A first spacer layer 406 disposes between the free layer 408 and the first AP pinned layer 404, and a second spacer layer 410 disposes between the free layer 408 and the second AP pinned layer 412. The dual spin valve 400 further comprises a first and second antiferromagnetic (AF) layers 414 and 402 located on top and bottom of the spin valve 400, which sandwich the entire structure of the spin valve 400. The materials and thickness of each layer in the dual spin valve 400 are similar to the layers in the spin valve 100 referring to FIG. 1.

The first AP pinned layer 404 comprises a first ferromagnetic pinned sublayer 416, a second ferromagnetic pinned sublayer 420, and an anti-parallel (AP) spin spacer sublayer 418 between the first pinned sublayer 416 and the second pinned sublayer 420. The second AP ferromagnetic pinned layer 412 comprises a first ferromagnetic pinned sublayer 422, a second ferromagnetic pinned sublayer 426, and an anti-parallel (AP) spin spacer sublayer 424 between the first pinned sublayer 422 and the second pinned sublayer 426. Either or both sublayers 416 and 426 of two AP pinned layers 404 and 412 could be the highly resistive layers, which are located farthest from the spacer layers 406 and 410. The sublayers 416 and/or 426 are made of a high resistivity alloy that is similar to the high resistivity materials of highly resistive pinned sublayer 106 referring to FIG. 1. The resistivity values of the sublayers 416 and/or 426 are typically between about 30 $\mu\Omega$-cm and 100 $\mu\Omega$-cm.

An example is given below to show the effect of the high resistivity material in the pinned layer to the value of ΔR/R. A simple spin valve with a complete structure denoted by NiFeCr (40)/NiFe (35)/Co (6)/Cu (20)/Co (30)/IrMn (60)/Ta (40), which includes an underlayer of NiFeCr 40 Å thick, a free layer of NiFe 35 Å thick, a Co nanolayer 6 Å thick, a Cu spacer layer of 20 Å thick, a Co pinned layer of 30 Å thick, and a Ta capping layer 40 Å thick, gives a ΔR/R value of about 14.5%. An AP spin valve, which is a simple spin valve with the additional ferromagnetic pinned sublayer of Co 20 Å thick and an AP spacer sublayer of Ru 6 Å thick, with the structure NiFeCr (40)/NiFe (35)/Co (6)/Cu (20)/Co (20)/Ru (6)/Co (30)/IrMn (60) /Ta (40) gives a ΔR/R value of about 10%. The value of ΔR/R drops 4.5 percentage points due to the shunting loss from the additional Ru and Co sublayer. If, instead, the additional ferromagnetic pinned sublayer is comprised of $(Co_{90}Fe_{10})_{90}B_{10}$ instead of Co, the ΔR/R value of 12% is obtained since Boron increases the resistivity of this pinned sublayer.

Figure 5:
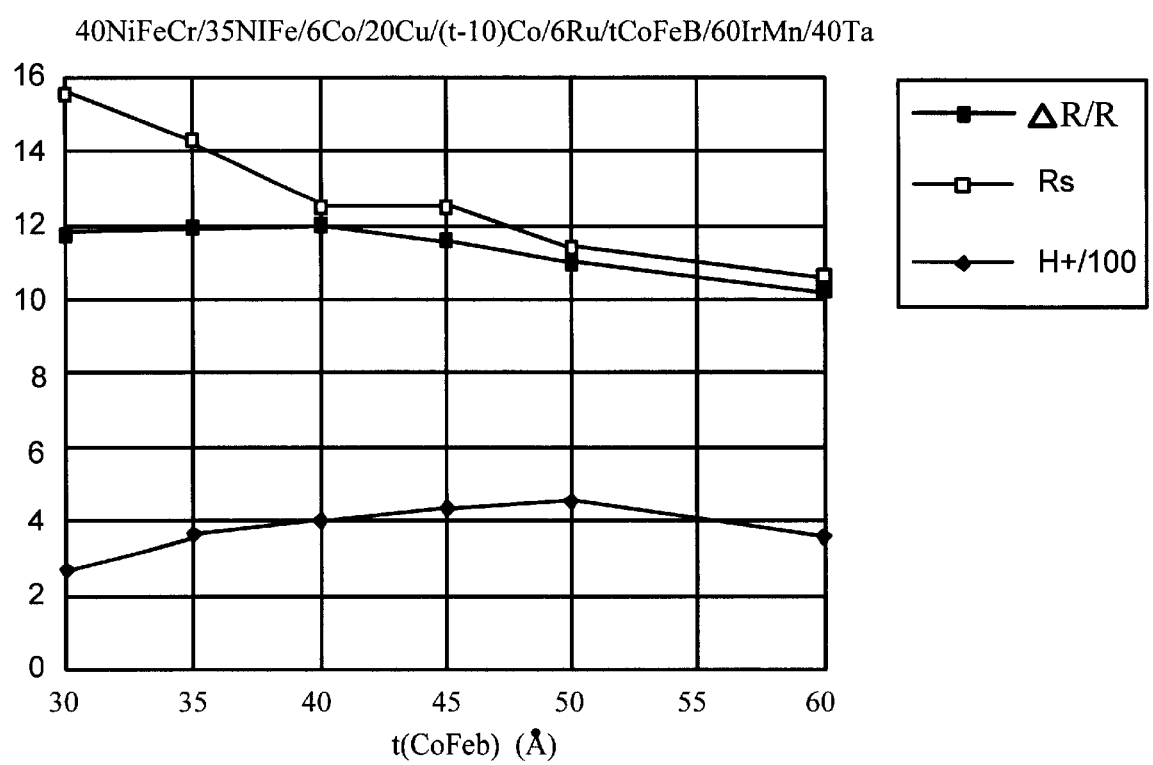
FIG. 5 is a graph depicting plots illustrating the properties of spin valves with highly resistive AP pinned sublayers of various thicknesses.

FIG. 5 is a graph illustrating the properties of a spin valve with various thickness of AP pinned sublayer. The difference in thickness of the highly resistive CoFeB sublayer and Co sublayer is kept constant at 10 Å. FIG. 4 shows the variation in the values of the change in the resistance of the spin valve (ΔR/R), the pinning field (H+), and the resistivity of the spin valve (Rs) with the thickness of the highly resistive pinned sublayer as a parameter in a complete spin valve. The highly resistive sublayer is made of CoFeB with the thickness t varying from 30 Å to 60 Å. The spin valve, which has a complete structure of 40NiFeCr/35NiFe/6Co/20Cu/(t–10)Co/tCoFeB/60IrMn/40Ta, comprises an underlayer of NiFeCr 40 Å thick, a free layer of NiFe 35 Å thick, a nanolayer of Co 6 Å thick, a spacer layer of Cu 20 Å thick, a first pinned sublayer of Co (t−10)Å thick, an AP spacer sublayer of Ru 6 Å thick, a highly resistive pinned sublayer of CoFeB with the thickness t varying from 30 Å to 60 Å, an AF layer of IrMn 60 Å thick, and a cap layer of Ta 40 Å thick.

From the graph in FIG. 5, the resistivity (Rs) value of the spin valve decreases from about 15.3 Ω/square to 10.5 Ω/square as its thickness increases from 30 Å to 60 Å in accordance to well-known physical principles of resistance and resistivity. The optimum ΔR/R value for a spin valve of this structure is about 12% that is achieved when the thickness of the CoFeB pinned sublayer is about 40 Å. The pinning field (H+) value corresponding to this thickness of the CoFeB pinned sublayer is about 400 (Oe) . The graph shows that the highest value of the pinning field (H+) is achieved when the thickness of the highly resistive pinned sublayer is about 50 Å, and the ΔR/R value is 11%. In general, the higher the value of the pinning field, the better the spin valve's performance. However, the value of the pinning field depends inversely on the difference between the magnetizations of the two AP ferromagnetic pinned sublayers, which can be adjusted by varying the thicknesses of these layers.

It will be clear to one skilled in the art that the above embodiment may be altered in many ways without departing from the scope of the invention. Accordingly, the scope of the invention should be determined by the following claims and their legal equivalents.

What is claimed is:

1. A spin valve comprising:
   an antiferromagnetic (AF) layer; and
   a ferromagnetic pinned layer; and
   an AP ferromagnetic free layer; and
   a non-magnetic spacer layer between the AP ferromagnetic free layer and the ferromagnetic pinned layer;
   wherein at least one sublayer of the AP ferromagnetic free layer includes a highly resistive alloy of type AB, where A is selected from the group consisting of CoFe, NiFe, and CoFeNi, and B is selected from the group consisting of B, Ta,Nb, Zr and Hf.

2. The spin valve of claim 1, wherein the AP ferromagnetic free layer comprises a first ferromagnetic free sublayer, a second ferromagnetic free sublayer, and an AP spacer sublayer between first and second ferromagnetic free sublayers.

3. The spin value of claim 1, wherein a highly resistive ferromagnetic free sublayer is located farthest from the non-magnetic spacer layer with respect to said other at least one sublayer of the AP ferromagnetic free layer.

4. The spin valve of claim 1, wherein the free layer is nanolayered with an alloy selected from the group consisting of Co, CoFe, and CoFeB.

* * * * *